(12) United States Patent
Hackl

(10) Patent No.: US 8,768,596 B2
(45) Date of Patent: Jul. 1, 2014

(54) DEVICE FOR SPEED CONTROL OF A VEHICLE HAVING A SPEED DIRECT SETTING CONTROL ELEMENT

(75) Inventor: Thomas Hackl, Asperg (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 415 days.

(21) Appl. No.: 12/807,557

(22) Filed: Sep. 7, 2010

(65) Prior Publication Data
US 2011/0066349 A1  Mar. 17, 2011

(30) Foreign Application Priority Data
Sep. 9, 2009  (DE) .................. 10 2009 040 800

(51) Int. Cl.
*B60T 8/32* (2006.01)
*G06F 7/00* (2006.01)

(52) U.S. Cl.
USPC .................. 701/93; 701/70; 701/91

(58) Field of Classification Search
USPC ........................ 701/25, 70, 91, 93
See application file for complete search history.

(56) References Cited

U.S. PATENT DOCUMENTS

| | | | |
|---|---|---|---|
| 6,374,173 B1* | 4/2002 | Ehlbeck | 701/93 |
| 6,671,607 B2* | 12/2003 | Ishizu et al. | 701/93 |
| 6,732,039 B2* | 5/2004 | Ino et al. | 701/93 |
| 6,847,880 B2* | 1/2005 | Ishizu et al. | 701/95 |
| 7,092,811 B2* | 8/2006 | Ishizu et al. | 701/93 |
| 8,248,223 B2* | 8/2012 | Periwal | 340/441 |
| 2001/0044691 A1* | 11/2001 | Ishizu et al. | 701/93 |
| 2003/0105574 A1* | 6/2003 | Ino et al. | 701/93 |
| 2004/0068359 A1* | 4/2004 | Neiss et al. | 701/96 |
| 2004/0093144 A1* | 5/2004 | Ishizu et al. | 701/93 |
| 2008/0195310 A1* | 8/2008 | Yamada | 701/208 |
| 2009/0043439 A1* | 2/2009 | Barfoot et al. | 701/25 |
| 2009/0063000 A1* | 3/2009 | Kodama et al. | 701/75 |
| 2010/0004848 A1* | 1/2010 | Transou, Jr. | 701/110 |
| 2010/0168976 A1* | 7/2010 | Andrasko et al. | 701/70 |

FOREIGN PATENT DOCUMENTS

| | | | | |
|---|---|---|---|---|
| DE | 19850686 A1 * | 4/2000 | | |
| DE | 198 50 686 | 5/2000 | | |
| DE | 10 2007 025 715 | 1/2008 | | |
| DE | 10 2006 053 934 | 5/2008 | | |
| DE | 10 2007 015 303 | 10/2008 | | |
| DE | 10 2008 031 716 | 1/2009 | | |
| DE | 102008031716 A1 * | 1/2009 | | F02D 11/10 |

OTHER PUBLICATIONS

German Examination Report.

* cited by examiner

*Primary Examiner* — Khoi Tran
*Assistant Examiner* — Jorge Peche
(74) *Attorney, Agent, or Firm* — Kenyon & Kenyon LLP

(57) ABSTRACT

A device for the speed control of a vehicle, containing an operator control unit, via which the driver specifies a setpoint speed to be maintained by the vehicle, and a control unit, which positions final controlling elements of the vehicle according to the driver's specification. The device provides that the operator control unit contains at least one speed direct setting control element, which is used for setting a specific setpoint speed value, and the specific setpoint speed value of the vehicle is specifiable and directly settable by a one-time operation of the speed direct setting control element, independently of the instantaneous actual speed of the vehicle.

11 Claims, 1 Drawing Sheet

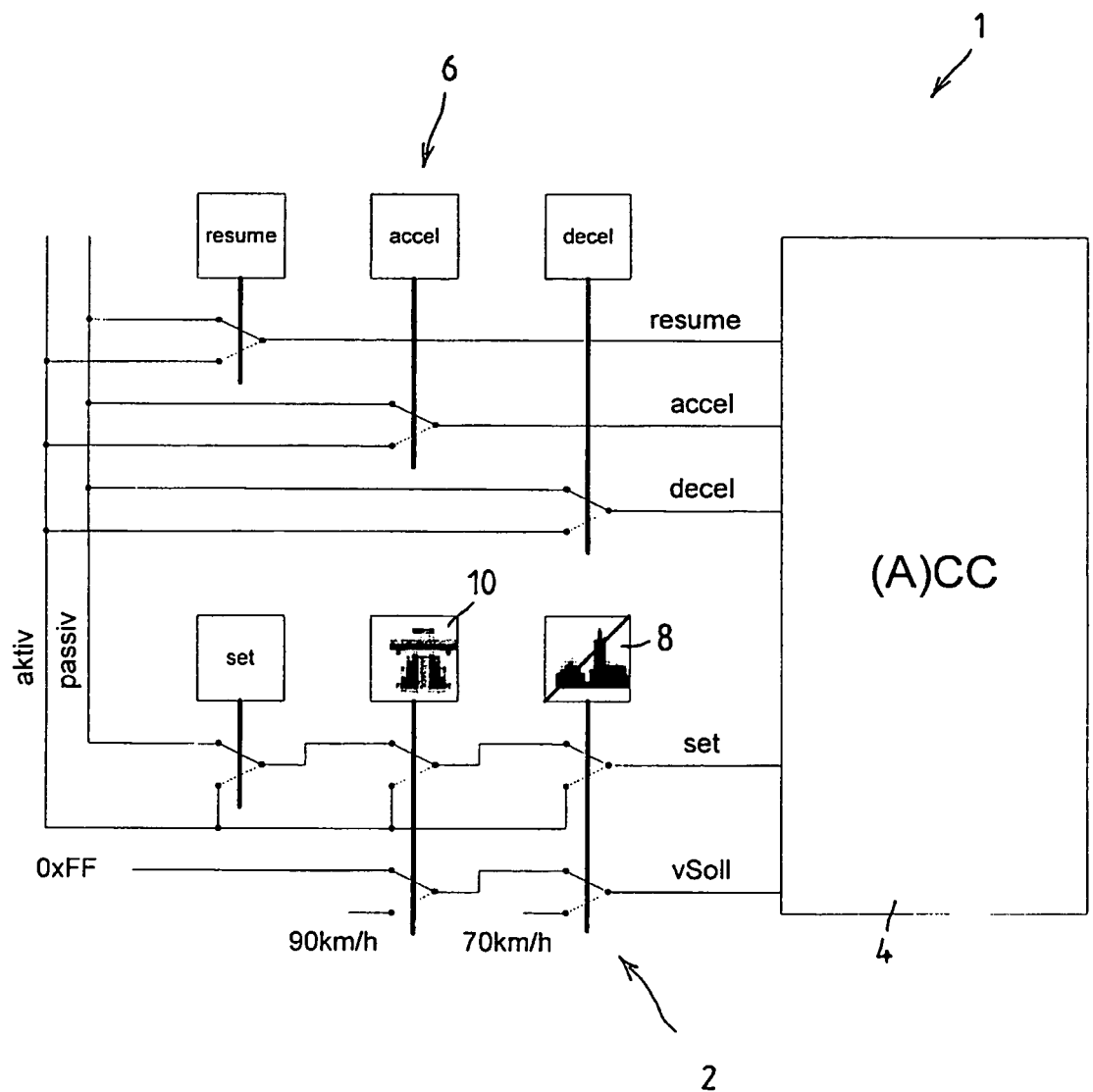

DEVICE FOR SPEED CONTROL OF A VEHICLE HAVING A SPEED DIRECT SETTING CONTROL ELEMENT

RELATED APPLICATION INFORMATION

The present application claims priority to and the benefit of German patent application no. 10 2009 040 800.2, which was filed in Germany on Sep. 9, 2009, the disclosure of which is incorporated herein by reference.

FIELD OF THE INVENTION

The present invention is directed to a device for speed control of a vehicle containing an operator control unit, via which the driver specifies a setpoint speed to be maintained by the vehicle, and a control unit, which positions final controlling elements of the vehicle according to the driver's specification.

BACKGROUND INFORMATION

Such a device is discussed, for example, in German patent document DE 10 2007 025 715 A1. This device is used for the purpose of controlling the driving speed and has a control lever for this purpose, which is pivotable in the upward or downward directions from a middle location around an axis parallel to the steering column. The control lever is used for setting a limiting speed, which the vehicle is not to exceed even if the driver requests a speed above the limiting speed by operating the gas pedal. If the driver moves the control lever in the upward or downward direction, a speed increment is generated, by which a limiting speed set by the lever movement differs from the instantaneous actual speed of the vehicle. A speed increment having a positive sign is generated in the case of an upward movement of the control lever and a speed increment having a negative sign is generated in the case of a downward movement of the control lever. By pivoting the control lever upward or downward multiple times or by holding the control lever in the position pivoted upward or downward, the speed increment is generated multiple times. As a result, a limiting speed may be set which is by varying amounts above or below the instantaneous actual speed of the vehicle.

If the driver wishes to set a specific speed as the setpoint speed, he must either first accelerate the vehicle to the desired speed and then set the instantaneous actual speed as the setpoint speed, or he must first set the instantaneous actual speed as the setpoint speed and then adapt the setpoint speed to the desired setpoint speed via the control lever.

However, this type of setting of the limiting speed has the disadvantage that the driver must operate the control lever for a relatively long time, in particular in the case of a greater difference between the actual speed and the setpoint speed, and must also ensure a correct setting of the setpoint speed.

The exemplary embodiments and/or exemplary methods of the present invention is based on the object of refining a device of the type cited at the beginning in such a way that the setpoint speed is set in a more comfortable and simple manner.

This object is achieved according to the exemplary embodiments and/or exemplary methods of the present invention by the features described herein.

SUMMARY OF THE INVENTION

According to the exemplary embodiments and/or exemplary methods of the present invention, the operator control unit contains at least one speed direct setting control element, which is used for setting an established setpoint speed value, the established setpoint speed value of the vehicle being specifiable and directly settable by a one-time operation of the speed direct setting control element, independently of the instantaneous actual speed of the vehicle.

The exemplary embodiments and/or exemplary methods of the present invention is based on the idea that in particular for utility vehicles, typical setpoint speeds exist for various road categories (e.g., 60 to 70 km/h on rural roads, 80 to 90 km/h on freeways, depending on the country). It is thus to be assumed that these speeds are frequently set as the setpoint speed. Therefore, speed direct setting control elements are defined, upon whose operation a specified setpoint speed is directly set, independently of the speed at which the vehicle is moved at the moment of operation.

In the case of a plurality of such speed direct setting control elements, for example, one setpoint speed value may be assigned to each of the speed direct setting control elements according to a specific road category such as a freeway or a rural road. The desired setpoint speed which is assigned to the particular road category is set solely by a one-time operation of the corresponding speed direct setting control element, without repeated operation being required for this purpose. This functionality therefore results in a high operating comfort of the device for speed control and dispenses with the incremental setting of the setpoint speed of the related art.

Advantageous refinements of and improvements on the exemplary embodiments and/or exemplary methods of the present invention specified herein are possible through the measures listed in the subclaims.

Particularly, the device for speed control of the vehicle may be activated and the specified setpoint speed value is simultaneously set by operating the at least one speed direct setting control element only once. The device does not need to be previously activated separately when the established setpoint speed value is to be set.

According to a refinement, the established setpoint speed value to be set is permanently assigned from the beginning to the at least one speed direct setting control element. The particular speed direct setting control element is permanently allocated an established setpoint speed value. For example, speed direct setting control elements are possible, via which vehicle speeds may be set directly, as are typically driven on specific categories such as freeways or rural roads. For example, if a driver of a utility vehicle begins driving from a freeway rest stop and accelerates the vehicle via the gas pedal to 60 km/h, for example, in the acceleration lane, then operates the speed direct setting control element for the road category "freeway," the control unit accelerates the utility vehicle automatically and without action of the driver to 90 km/h, for example, so that the driver may concentrate fully on merging into the running traffic on the freeway.

An alternative thereto provides that the established setpoint speed value may be assigned by an external signal to the at least one speed direct setting control element as a function of the particular position of the vehicle in its lane and may be changed as a function of the lane, the external signal being generated by a GPS (global positioning system), a road category recognition unit, a recognition unit of traffic signs, or by an input of the driver performed via the operator control unit. The allocation of the particular speed direct setting control element takes place dynamically, as a function of the position in the lane, and remains constant as long as the boundary conditions, such as a speed limit, do not change. In the event of changing boundary conditions, the allocation of the speed direct setting control element is adapted automatically.

The operator control unit may additionally have a control element "set" for setting the currently provided actual speed as the setpoint speed value, the control unit being implemented in such a way that the setpoint speed value generated by operating the control element "set" is overwritten by the setpoint speed value generated by operating the speed direct setting control element. The speed setting by the speed direct setting control element thus has priority over an actual speed, which was previously set by the control element "set," as the setpoint speed.

The control unit may be a control unit of a cruise control (CC), an adaptive cruise control (ACC), or a driving speed limiter. The adaptive cruise control is based on a cruise control which maintains a setpoint speed desired by the driver. In addition, the ACC automatically adapts the speed to changing traffic conditions by independently accelerating, easing off the accelerator pedal, or braking. The ACC thus allows a distance to the preceding vehicle as a function of the speed to be maintained.

At least one speed direct setting control element is implemented as a button, for example, the particular setpoint speed value being set by pressing the button once.

An exemplary embodiment of the present invention is shown in the drawing and explained in greater detail in the following description.

BRIEF DESCRIPTION OF THE DRAWING

The FIGURE shows a schematic circuit diagram of a specific embodiment of a device for speed control of a vehicle.

DETAILED DESCRIPTION

A schematic circuit diagram of a specific embodiment of a device for speed control of a utility vehicle is shown in the FIGURE by reference numeral 1. This device 1 is referred to in short hereafter as "cruise control."

Cruise control 1 contains an operator control unit 2, via which the driver specifies a setpoint speed to be maintained by the vehicle, and a control unit 4, which positions final controlling elements of the vehicle according to the driver command, such as the main engine and/or the brakes.

Operator control unit 2 includes, on the one hand, a cruise control lever 6 having at least three function positions, for example, the function positions being symbolized in FIG. 1 by the boxes "resume," "accel," and "decel". In other words, cruise control lever 6 has a position "resume" (resume), in which a cruise control regulation is begun at a previously stored setpoint speed, a position "set and decelerate" (decel), in which the setpoint speed is decremented until cruise control lever 6 is released, after which the cruise control regulation initially becomes active using a deceleration phase having the setpoint speed value which exists then, and a position "set and accelerate" (accel), which is similar to the previous position, but in which the setpoint speed value is incremented and the cruise control regulation accordingly begins with an acceleration phase.

The signals output by cruise control lever 6 may be transmitted to an electronic control unit of cruise control 1 by direct wiring (active, passive), but they may also be transmitted via existing information networks (e.g:, CAN, Flexray).

Operator control unit 2 may further contain a plurality of speed direct setting control elements 8, 10, which are used for setting specific setpoint speed values, specific setpoint speed values of the vehicle being specifiable and directly settable by a one-time operation of speed direct setting control elements 8, 10, independently of the instantaneous actual speed of the vehicle.

For example, a setpoint speed value is to be assigned to each of speed direct setting control elements 8, 10 according to a specific road category such as a freeway or a rural road. The desired setpoint speed assigned to the particular road category is then set solely by a one-time operation of corresponding speed direct setting control element 8, 10. For this reason, speed direct setting control elements 8, 10, which may be implemented as buttons, may symbolize the particular assigned road category and the setpoint speed connected thereto by a graphic representation, for example.

Speed direct setting control elements 8, 10 may also be connected to the direct wiring (active, passive), into which cruise control lever 6 also feeds its signals. The speed value specifications generated by corresponding speed direct setting control element 8, 10 are thus fed directly into electronic control unit 4.

Device 1 for speed control of the vehicle may particularly be activated and the predefined setpoint speed value is set simultaneously solely by a one-time operation of a speed direct setting control element (button) 8, 10. A one-time press of the button suffices to activate entire device 1 and also to set the desired setpoint speed.

An established setpoint speed value to be set may be permanently assigned to each of speed direct setting control elements (buttons) 8, 10 from the beginning. Particular speed direct setting control element 8, 10 permanently contains an established setpoint speed value, such as one button 8 having a setpoint speed of 70 km/h for rural roads and another button 10 having 90 km/h for freeways. This permanent assignment may already established be at the factory during the manufacturing of the vehicle or device 1 and may no longer be changed thereafter, for example, by the driver.

According to a further specific embodiment, however, various setpoint speed values may also be dynamically assigned to buttons 8, 10. This may be implemented, for example, by using road category recognition, for example, by an algorithm in the control unit or by information from a navigation system, by using video-based analysis of traffic signs, by using speed limits stored in digital maps, or also by using a desired setpoint speed fixed by the driver himself. Electronic control unit 4 receives corresponding external signals and "allocates" the corresponding setpoint speeds to the buttons.

Operator control unit 2 may additionally have a control element "set" (set), also implemented as a button, for example, for setting the currently existing actual speed as the setpoint speed value, the control unit being implemented in such a way that the setpoint speed value generated by operating the control element "set" is overwritten by the setpoint speed value generated by operating a speed direct setting control element 8, 10.

Therefore, when a speed direct setting control element 8, 10 is pressed, the same signal is transmitted as when the "set" button is pressed; however, in addition, a signal representing the setpoint speed to be set is generated. In contrast, if the "set" button is pressed, the value of the setpoint speed is either at an invalid value (e.g., 0×FF) or the instantaneous actual speed is fed as the setpoint speed signal into control unit 4. An advantage of this procedure is backwards compatibility. If no additional setpoint speed signal or an invalid setpoint speed signal is input into control unit 4, it is interpreted as the "set" signal. In contrast, if a valid setpoint speed signal exists, it is interpreted as originating from a speed direct setting control element 8, 10.

The List of reference numerals is as follows:
1 device;
2 operator control unit;
4 control unit;
6 cruise control lever;
8 speed direct setting control element; and
10 speed direct setting control element.

What is claimed is:

1. A device for controlling a speed of a vehicle, comprising:
    an operator control unit, via which a driver specifies a setpoint speed to be maintained by the vehicle; and
    a control unit, which positions final controlling elements of the vehicle according to the driver's specification;
    wherein the operator control unit contains at least one speed direct setting control element, which is used for setting a specific setpoint speed value, and wherein the specific setpoint speed value of the vehicle is specifiable and directly settable by a one-time operation of the speed direct setting control element, independently of the instantaneous actual speed of the vehicle;
    wherein the specific setpoint speed value is assignable by an external signal as a function of the particular position of the vehicle in its lane to the at least one speed direct setting control element and is changeable as a function of the lane.

2. The device of claim 1, wherein the device for controlling the speed of the vehicle is activated and the specified setpoint speed value is set simultaneously solely by a one-time operation of the at least one speed direct setting control element.

3. The device of claim 1, wherein the external signal is generated by a global positioning system (GPS), by one of a road category recognition unit, a recognition unit of traffic signs, and an input of the driver performed via the operator control unit.

4. The device of claim 1, wherein the operator control unit additionally has a set control element for setting the currently existing actual speed as the setpoint speed value, and wherein the control unit is implemented so that the setpoint speed value generated by operating the set control element is overwritten by the setpoint speed value generated by operating the speed direct setting control element.

5. The device of claim 1, wherein the control unit is a control unit of one of a cruise control, an adaptive cruise control (ACC), and a driving speed limiter.

6. The device of claim 1, wherein at least one of the speed direct setting control elements is implemented as a button, and wherein the particular setpoint speed value is set by a one-time press of the button.

7. The device of claim 1, wherein the operator control unit additionally has a set control element for setting the currently existing actual speed as the setpoint speed value, and wherein the control unit is implemented so that the setpoint speed value generated by operating the set control element is overwritten by the setpoint speed value generated by operating the speed direct setting control element, and wherein the control unit is a control unit of one of a cruise control, an adaptive cruise control (ACC), and a driving speed limiter.

8. The device of claim 7, wherein at least one of the speed direct setting control elements is implemented as a button, and wherein the particular setpoint speed value is set by a one-time press of the button.

9. The device of claim 1, wherein the established setpoint speed value is assigned by an external signal to the at least one speed direct setting control element as a function of the particular position of the vehicle in its lane and is changeable as a function of the lane.

10. The device of claim 9, wherein the allocation of the particular speed direct setting control element takes place dynamically, as a function of the position in the lane, and remains constant as long as the boundary conditions, such as a speed limit, do not change, and wherein in the event of changing boundary conditions, the allocation of the speed direct setting control element is adapted automatically.

11. The device of claim 10, wherein the external signal is generated by a GPS (global positioning system), a road category recognition unit, a recognition unit of traffic signs, or by an input of the driver performed via the operator control unit.

* * * * *